(No Model.)
L. A. COOPER & O. F. BOSTWICK.
Combinded Listing Plow and Seed Planter.
No. 232,689. Patented Sept. 28, 1880.
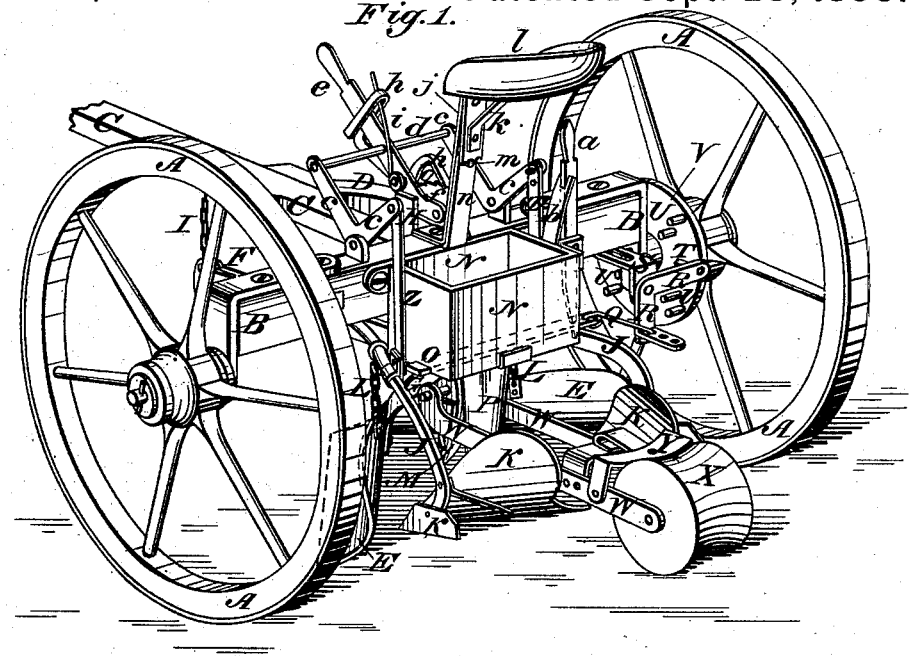
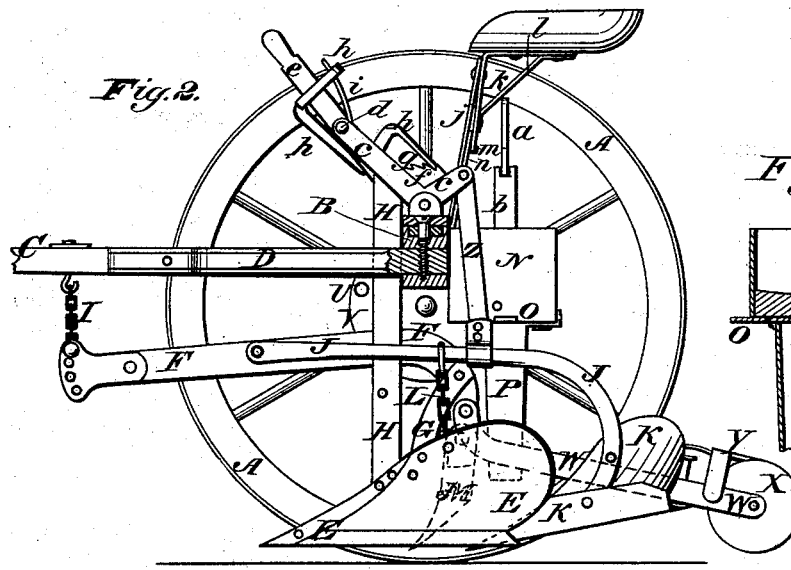
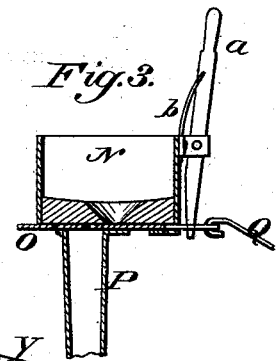

UNITED STATES PATENT OFFICE.

LEONARD A. COOPER AND OLIVER F. BOSTWICK, OF ATCHISON, KANSAS.

COMBINED LISTING-PLOW AND SEED-PLANTER.

SPECIFICATION forming part of Letters Patent No. 232,689, dated September 28, 1880.

Application filed April 19, 1880. (No model.)

*To all whom it may concern:*

Be it known that we, LEONARD ARNOLD COOPER and OLIVER FRANKLIN BOSTWICK, of Atchison, in the county of Atchison and State of Kansas, have invented a new and useful Improvement in Combined Listing-Plow and Seed-Planter, of which the following is a specification.

Figure 1 is a perspective view of the improvement. Fig. 2 is a sectional side elevation. Fig. 3 is a sectional elevation of the seed-hopper.

Similar letters of reference indicate corresponding parts.

The object of this invention is to furnish combined listing-plows and planters, so constructed as to open the ridge or clear a space for the row of hills, open a furrow to receive the seed, drop the seed, cover the seed, and roll down the soil, and which shall be simple in construction, readily adjusted and controlled, and reliable in operation.

A represents the wheels of the carriage; B, the axle; C, the tongue, and D the hounds. E is the listing-plow or clearer, which is designed to be made in five parts—viz., a point, two shares, and two mold-boards—connected together by straps and bolts in such a way that the outer ends of the shares and mold-boards may be adjusted wider apart or closer together, as desired.

The plow E is connected with the beam F by the straps G and standard H. The upper part of the standard H passes up through a slot in the tongue C, at the forward side of the axle B, to give steadiness to the plow and to serve as a means for drawing the carriage. The forward end of the beam F is connected with the tongue C by a short chain, I, to regulate the depth to which the plow enters the ground and to support the weight of the double-tree.

To the opposite sides of the middle part of the beam F are pivoted the forward ends of two beams, J, the rear ends of which are curved downward and have plows K attached to them. The plows K work at a lower level than the listing-plow E, and have their mold-boards upon their inner sides, so as to throw the soil inward and cover the seed.

The listing-plow E is connected with the beams J adjustably by two chains, L, so that the plows K may be adjusted to enter the ground to any desired depth below the listing-plow E, and so that the listing-plow may be raised from the ground by and with the plows K.

To the downwardly-curved rear end of the main beam F is attached a plow, M, to open a furrow to receive the seed, which plow is designed to be secured to the beam F by a bolt passing through the said beam and through a slot in the plow M, so that the plow M can be adjusted to work deeper or shallower in the ground by loosening the said bolt.

To the rear side of the axle B is attached the seed-hopper N, in the bottom of which is formed a hole, through which the seed passes into the hole in the seed-dropping slide O. The slide O carries the seed over and drops it into the upper end of the spout P, through which it passes to the ground. The spout P passes down close in the rear of the opening-plow M to deposit the seed in the furrow before the furrow has been partially filled by the falling in of the soil.

The slide O works in a groove in the bottom of the hopper N, above the upper end of the spout P, and to one of its ends is pivoted the inner end of a short connecting-rod, Q, the outer end of which is pivoted to the rearwardly-projecting end of the inner arm of the right-angled lever R. The lever R is pivoted at its angle to the downwardly-bent rear end of a bar, S, which crosses the lower side of the axle B, and is slotted longitudinally to receive the bolt by which it is secured to the axle B, so that the bar S may be adjusted to cause the hills to be dropped farther apart or closer together, as will be hereinafter described. The rearwardly-projecting rear end of the lever R has a number of holes formed in it, so that the point of attachment of the rod Q may be adjusted as the bar S is adjusted to cause the slide O to be drawn back in a straight line, however the bar S may be adjusted.

Upon the forward side of the end of the outer arm of the lever R is formed, or to it is attached, a lug or pin, T, in such a position as to be struck by the pins or lugs U, attached to the plate V, which is secured to the inner end of the hub of the drive-wheel A. The distance apart of the hills is regulated by the number of pins attached to the plate V.

If desired, two or more concentric circles of pins or lugs U, having a different number in each circle, may be formed upon the plate V, so that the machine may be adjusted to plant the hills farther apart or closer together by adjusting the slotted bar S.

To the side of the hopper N is pivoted a lever, a, the lower end of which enters a hole in the seed-dropping slide O.

To the upper part of the hopper N is attached the lower end of a spring, b, the upper end of which bears against the upper part of the lever a in such a direction as to press the slide O into the hopper N when the lever R is released from the pins U and discharge the seed into the spout P.

The seed-dropping device may be thrown out of gear by backing the machine, so that the pins U will push the outer end of the lever R out of the sweep of the said pins U, or by operating the lever a by hand.

To the opposite sides of the rear part of the beam F are pivoted the forward ends of two bars, W, to and between the rear ends of which is pivoted a roller, X, to press the soil down upon the seed. The face of the roller X is concaved, as shown in Fig. 1, to properly round off the top of the ridge.

To the bars W is attached a scraper, Y, the edge of which is so formed as to fit into the cavity of the roller X and scrape off any soil that may adhere to the said roller. If desired, weight may be applied to the bars W, to cause the roller X to pack the soil more closely.

The plows K, or the beams J, that carry the said plows, may be connected by a cross-bar to keep the said plows K at the proper distance apart.

The mold-boards of the plows K, or some other parts of or attachments to the said plows, project inward beneath the bars W, so that the roller X may be raised by and with the said plows K.

To the plow-beams J are attached the lower ends of the connecting-bars Z, the upper ends of which are pivoted to the ends of the rear arms of the bent or angular levers c. The levers c are pivoted at their angles to supports attached to the axle B, and the ends of their forward arms are connected by a cross-bar or round, d. The middle part of the round d passes through a lever, e, the lower end of which is pivoted to the center of a semicircular plate, f, attached to the axle B. The upper end of the lever e projects into such a position that it may be conveniently reached and operated by the driver from his seat to raise the plows from the ground; or the plows may be raised from the ground by the driver by pressing against the bar or round d with his foot.

Upon the curved edge of the plate f are formed ratchet-teeth g, with which the pawl h engages to hold the plows securely in any position into which they may be adjusted. The pawl h is bent forward, upward, and rearward, is pivoted to the lever e, and its upper end is bent forward upon itself to form a loop to receive the said lever e, as shown in Figs. 1 and 2. The engaging end of the lever-pawl h is held against the teeth g of the catch-plate f by a spring, i, attached to the lever e, and which is connected with the upper end of the said lever-pawl h.

To the middle part of the axle B is attached the lower end of a spring-standard, j, the upper part of which overlaps the upright arm of the bracket k, attached to the driver's seat l. The upper part of the upright arm of the bracket k is pivoted to the upper end of the standard j in such a way that the seat l may be tilted to either side to level the said seat when the machine is working upon inclined ground. The lower end of the upright arm of the bracket k is serrated or notched to receive a pin, m, attached to the upper end of the upright n, placed at the rear side of the spring-standard j, and attached at its lower end to the axle B, so that the seat l can be tilted to either side by pressing the said seat l forward to release the bracket k from the pin m.

Having thus fully described our invention, we claim as new and desire to secure by Letters Patent—

The combination, with the listing-plow E, covering-plows K, connecting-chains L, furrow-opener M, bars W, and roller X, of the lever e and intermediate connecting mechanism for simultaneously elevating the plows, opener, and roller, as and for the purpose specified.

LEONARD A. COOPER.
OLIVER FRANKLIN BOSTWICK.

Witnesses:
A. H. SOCKMAN,
R. B. DRURY.